J. SHEPHERD.
ELECTRIC GENERATOR AND MOTOR.
APPLICATION FILED JUNE 13, 1919.

1,384,865.

Patented July 19, 1921.
7 SHEETS—SHEET 1.

J. SHEPHERD.
ELECTRIC GENERATOR AND MOTOR.
APPLICATION FILED JUNE 13, 1919.

Fig.2.

UNITED STATES PATENT OFFICE.

JOSEPH SHEPHERD, OF LEEDS, ENGLAND.

ELECTRIC GENERATOR AND MOTOR.

1,384,865.  Specification of Letters Patent.  Patented July 19, 1921.

Application filed June 13, 1919. Serial No. 304,010.

*To all whom it may concern:*

Be it known that I, JOSEPH SHEPHERD, a subject of the King of Great Britain, residing at Leeds, England, have invented certain new and useful Improvements in Electric Generators and Motors, of which the following is a specification.

This invention has reference to improvements in electrical generators and electrical motors of the type in which the heat generated within the machine is dissipated by hollow cooling elements through which cooling elements are passed, the cooling elements being also made to serve the purpose of supports to the stator and rotor windings as described in my co-pending application Serial No. 186008, filed 13th August, 1917.

The present invention has for its object improvements in the construction of certain cooling elements and coil supports.

In the drawings hereto annexed:—

Fig. 1ª is a sectional view through part of the stator core of an alternating current generator or motor showing the end windings arranged at an angle.

The drawing shows two layers of end windings, each layer lying in recesses formed by spiral shaped projections on the supports. In the bottom right hand quadrant a portion of the external hollow clamp supporting the outer layer of windings is also shown.

The right hand half of the figure shows the projections forming winding recesses, the base of each winding recess being formed by a thin metal cover plate beneath which are certain passages for cooling liquids and a diaphragm. One cover plate is partially cut away to show beneath it the passages and diaphragm.

The left hand half of the figure is drawn with the cover plates entirely removed.

Fig. 5ª shows, in detail, one of the outer layer spiral shaped projections shown in Figs. 1 and 2, but omitted from Figs. 3 and 4, and lying upon and crosswise to the inner layer of projections shown in Fig. 5.

Figs. 6ª and 7ª are similar views of the thin metal cover plates for the hollow coil support shown in Figs. 2 and 4.

Fig. 9ª is an enlargement of a portion of Fig. 9.

Fig. 10ª is an enlargement of a portion of Fig. 10.

Figures 1, 1A:
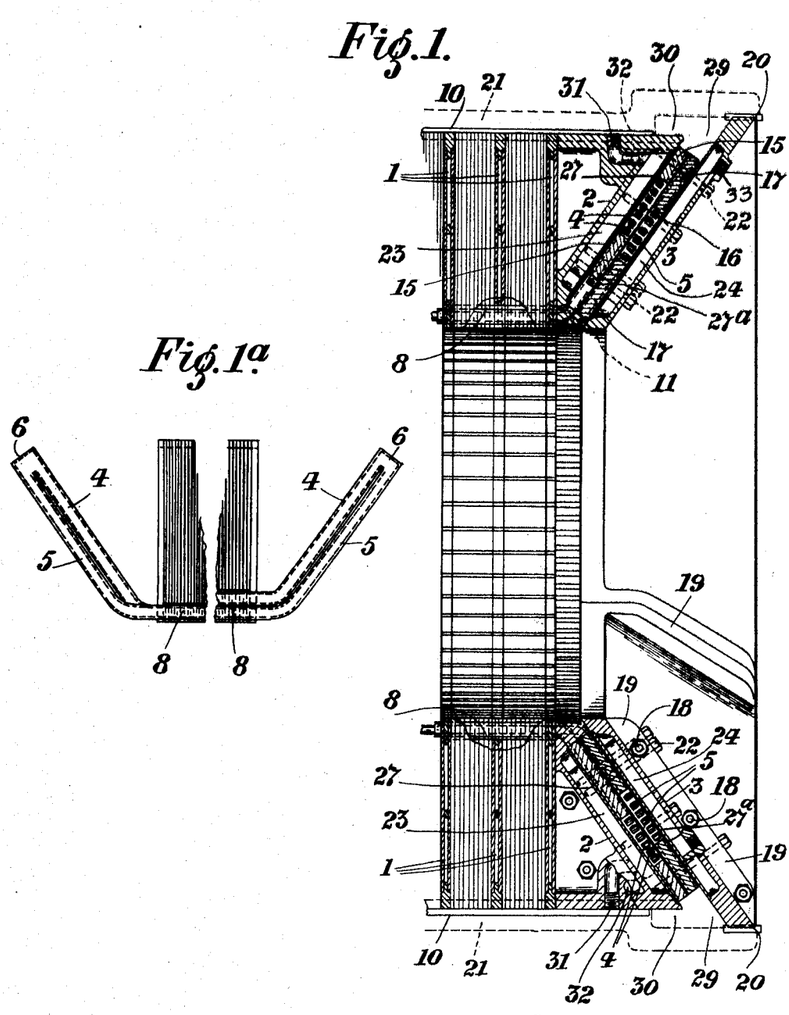
Figure 1 is a part sectional elevation of the stator of a single phase, two, or three phase generator.

In Fig. 1 the coil supports are of two general patterns numbered respectively 1 and 2 and as a development to the support 2 an outer hollow clamp 3 is shown.

The coil supports 2 and 3 are designed to suit the well known form of conical end winding where the end connectors are arranged in two conical layers in accordance with the diagrammatical representation of this familiar form of winding shown in Fig. 1a wherein stator bars are shaped into or connected to a series of end connectors set at an angle thereto and forming an inner layer 4 and to a series of end connectors forming an outer layer 5.

In the present invention the outer layer 5 nearer to the central axis of the machine is supported by the coil support 3 and the inner layer 4 is supported by the coil support 2.

Within the core of the stator the windings are arranged either in one layer or in two layers as alternatively illustrated to left and right of Fig. 1a.

The coil support 2 consists of a framework of gun-metal, hard brass or other suitable metal with keyways 9 engaging with the keys 10 of the stator stampings clamping the stampings tightly together.

On the portion of the said framework contiguous to the core slots, winding slots 11 in Figs. 1 to 4 are machined out of the metal of the framework corresponding with the slots 8 in the stator core, to give a continuous uniform winding slot for the conductor, as it emerges from the core slot.

In electrical generators and motors as ordinarily constructed, the portion of the windings without the core slots is particularly subject to mechanical stresses on short circuit and overload and it is in this portion or near it that breakdowns generally occur. The object of this invention is to provide means of continuous support to the coils to enable them to withstand such mechanical stresses. Continuous support for the portions of the windings without the core slots is obtained by providing recesses 12 (Fig. 3) on the surface of the coil support 2, the recesses being made of spiral shape on the outer conical face of the framework 2, the sides 14 of the recesses being formed by the walls of the projections 15 cast with or attached to the framework 2. The width of the recesses may, conveniently, be made sufficient to take several connectors. The provision of a separate recess for each connector is applicable in the case of large connectors, but the application of the invention can take the form either of numerous recesses of narrow width or of fewer recesses of greater width in which several bars are laid together in the same recess.

The ends of the inner layer of connectors 4 terminate at 6 near the outer periphery of the support 2, here they would be jointed to the connectors forming the outer layer 5 and which are bent spirally to lie upon the inner layer of connectors 4, just described, the outer layer of connectors being bent in the reverse manner to that of the inner layer to complete the angle of the winding pitch.

Figure 11:
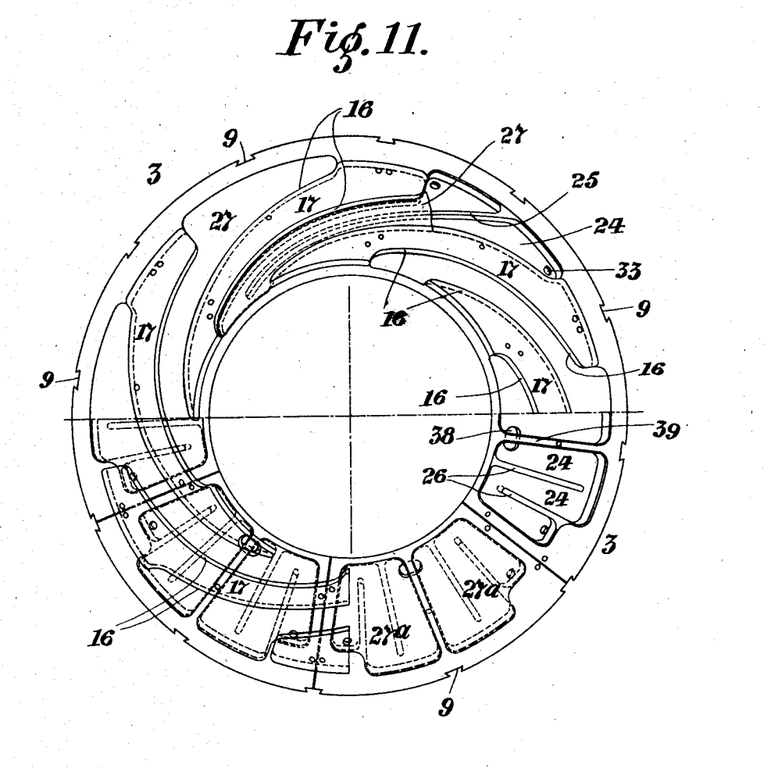
Fig. 11 is a view at right angles to Fig. 1, that is, in reverse to Figs. 2, 3 and 4, looking away from the stator core and showing the face,—on the side contiguous to the outer layer of end windings,— of the external hollow clamp supporting the outer layer of windings.

The connectors 5 of the outer layer are laid in a series of spiral recesses in the outer coil support 3 and in a manner similar to that already described, for the support 2, and a greater or less number of winding recesses of less or greater width would be provided on the inner side of the winding face of the outer support 3 as shown in Fig. 11.

In like manner the sides 16 of these winding recesses would be formed by the walls of projections 17.

Figure 2:
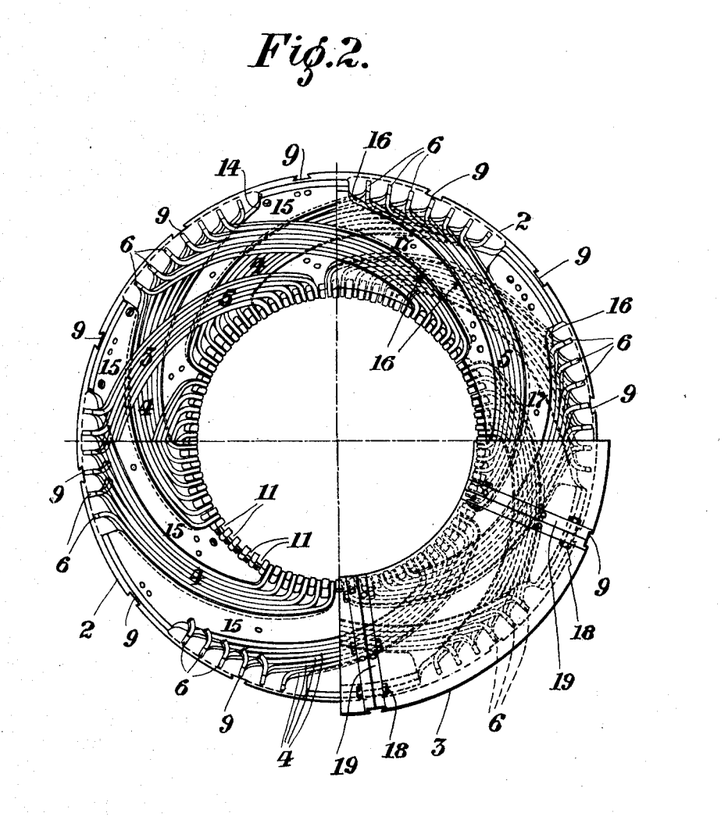
Fig. 2 is a view at right angles to Fig. 1 looking toward the stator core and showing, in various sections, the hollow coil support.

It will sometimes be convenient to divide the coil support 3 into a number of segments as shown in the lower half of Fig. 11 and in the bottom right hand quadrant of Fig. 2 which, collectively, will form a ring upon the outer layer of connectors, as shown in Fig. 11, the segments being bolted together by bolts 18 through lugs or flanges 19 at the joints between the various segments as shown in Figs. 1, 2 and 7a.

The insulation upon the connectors is usually of a character which is brittle, when cold, and pliable, when hot, it will therefore be desirable to provide means for heating up the connectors before and while the coil supports 3 are being fixed in place so that the coils may safely be molded or adjusted to a shape to fit more easily and more exactly within the recesses provided for them, such means of heating are referred to later.

When the connectors are all in place with the outer coil supports upon them, their relative positions will be as shown in Fig. 1, and in certain portions of Fig. 2.

The coil support 3 or the various segmented parts forming the same are held in place against rotary movement by keys 20, Fig. 1, engaging in the stator frame 21 and are clamped upon the windings and retained in place by set screws 22 inserted into the projections between the winding slots on the supports 2.

For cooling the coil supports 2 and 3 internal ducts or passages 23 and 24 for the cooling liquid are provided with diaphragms 25 and 26 respectively, arranged to distribute the cooling liquid uniformly through the ducts or passages.

Figures 6, 7:
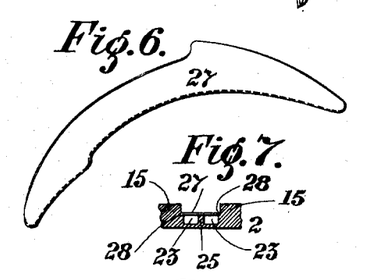
Figs. 6 and 7 show in detail the thin metal plates covering the passages for cooling liquids.
Figures 6A, 7A:
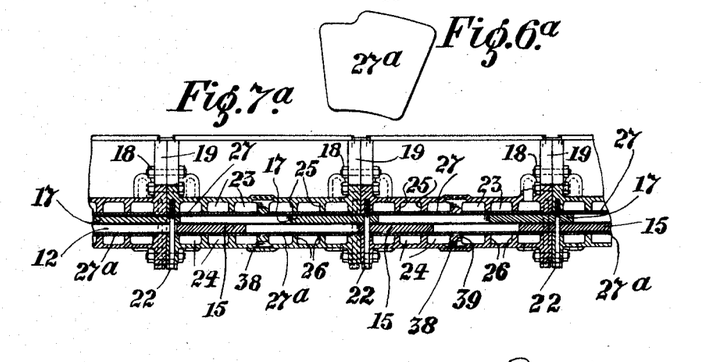

For convenience of construction the supports 2 and 3 are preferably cast with the solid walls and diaphragms in one piece and generally with the passages for the cooling liquid open, the passages being then inclosed by sheets of hard brass or similar metal 27, 27a, laid upon machined ledges 28 provided for them and jointed up by fusion welding with an oxy-acetylene flame or welded electrically, or brazed as shown in Figs. 6, 7, 6a, 7a, the covering plates 27, 27a being separately shown in Figs. 6 and 6a and shown welded in place in Figs. 7 and 7a.

This method is adopted to provide a thinner plate of metal close to the conductors, the thinner the plates 27, 27ᵃ the less will be the eddy currents induced in them owing to their proximity to the active conductors.

Room for expansion of the conductors is allowed by providing space 29 between the stator frame and the ends of the coils. At this position and at various parts of the periphery, it will be convenient to lead out the connections between the windings and the machine terminals, the room for the connections to the phase terminals and in the case of three phase machines to the star point, is provided in the space 30 adjoining.

Figure 3:
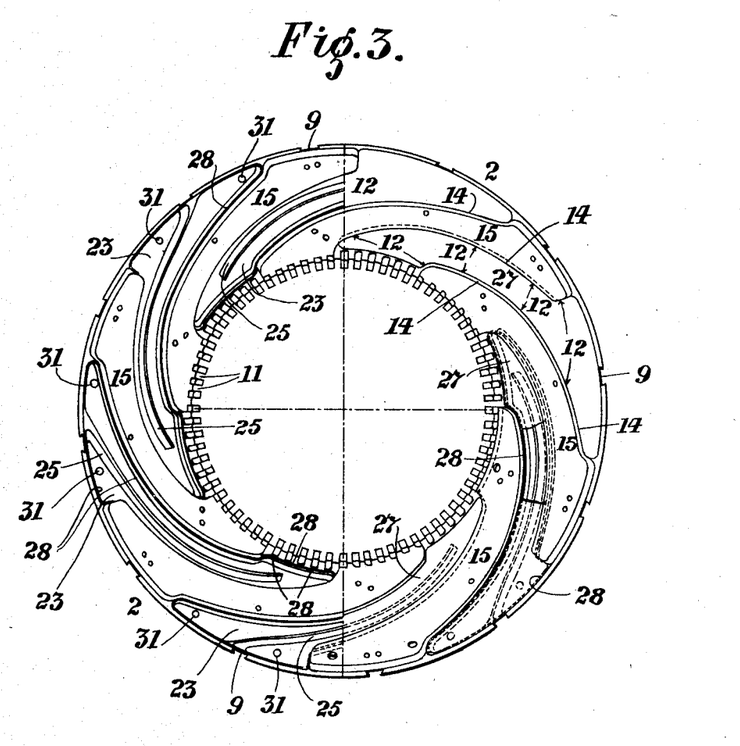
Fig. 3 is a further view at right angles to Fig. 1 looking toward the stator core, showing the hollow coil support shown in Fig. 2 from which, for clearness, the windings and the said outer layer of spiral shaped projections are omitted.

The passages 23 in support 2 are shown arranged in a sinuous form by the provision of a diaphragm 25, Fig. 3. From each passage 23 the cooling liquid enters and leaves by the holes 31 which can be connected in any convenient manner to flow, return, or air vent pipes or ducts, as for instance through screwed outlets 31, or cross connecting ducts 32, Fig. 1. If desired the cooling liquid can be arranged to flow around the entire circumference of the support or in two or more separate streams flowing around a half or a less part of the circumference.

The corresponding inlet and outlet holes 33, for the cooling liquid, in coil supports 3 can be connected up in a similar manner to those of support 2.

Figures 5, 5A:
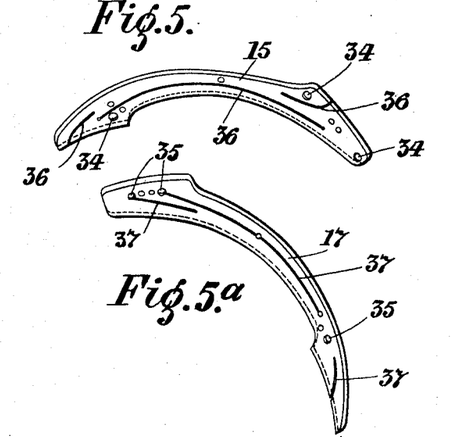
Fig. 5 shows, in detail, one of the inner layer spiral shaped projections shown in Figs. 1 and 2.

In a modification which gives a simpler method of construction to that of casting the projections solid with the coil support, the faces of the supports 2, 3, on which the windings are supported, are made of plain conical shape, without winding recesses. The coils are supported against rotary or angular displacement by inserting projections of suitable shape as 15, 17, in Figs. 5 and 5ᵃ between the various groups of windings and attaching them to the conical faces of supports 2 and 3 respectively, as, for instance, by means of screws with countersunk heads which pass respectively through holes 34, 35 (Figs. 5 and 5ᵃ) in projections 15 and 17, also the separate projections 17 may be screwed to the projections 15, instead of to the face of the coil support 3. The arrangement of screwing projections 15 to the face of support 2 and the projections 17 to the face of the projections 15 is shown in Fig. 2. These separate projections 15, 17, are shown in Figs. 5 and 5ᵃ and they are constructed of metal of suitable non-magnetic and of high electrical resistance qualities or of vulcanized fiber, hard wood or the like. If constructed of metal I provide a number of saw cuts 36 or 37 to reduce eddy currents induced in them from the active conductors. To preserve rigidity these saw cuts are afterward filled with insulation.

For machines of large size it is convenient to construct the coil supports 2 and 3 in several parts and to provide a stronger support for the covering plate 27 than is shown in Fig. 3 already described.

Figure 4:
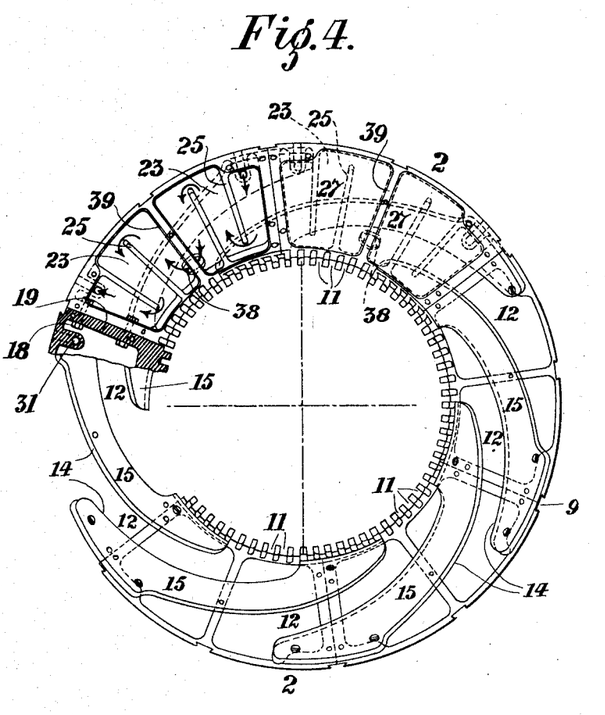
Fig. 4 shows an alternative construction of the hollow coil support for large machines where it is desirable to make the support in sectors bolted together. At the left of the figure one sector is only partially shown and one of the adjacent sectors is shown without a cover plate to the passage for cooling liquid while the other adjacent sector shows the cover plate in position but with the projections forming the coil recesses indicated by dotted lines only. The remaining sectors are shown with the spiral shaped projections in position.

The modified construction is shown in Fig. 4. The coil support is shown constructed in six sectors bolted together by bolts 18 through flanges 19 forming a complete ring. Recesses for the windings are provided by fixing the separate projections 15 on the conical face of the support, and are separately shown in Fig. 5. At the bottom portion Fig. 4 one of the six sectors is only partially shown (in section) in order to show the detached projections 15 (Fig. 5) more clearly. A separate cooling liquid supply is provided to each sector, the path of the liquid being indicated by arrows on the drawing, and a passageway 38 being provided through the diaphragm or wall 39 at the center of each sector.

The corresponding segmental division of the coil support 3 is shown in the lower half of Fig. 11 and one of the spiral projections 17 is shown in the position which it would occupy in relation to this support whether screwed thereto or whether screwed to the corresponding inner spiral projection 15 of coil support 2.

The remainder of the projections 17 are omitted from this figure to show more clearly the plain conical face of the support and the arrangement of the cover plate 27ᵃ which is analogous to that shown in Fig. 4.

A developed sectional drawing of the supports 2 and 3 made up in segmental form, is given in Fig. 7ᵃ.

The coil supports 1 which are built into the stator core are made in profile corresponding to those of the stator disks, which are shown in cross section at Figs. 1 and 1ᵃ, such profile being of any well known type and varying according to the requirements and design of the machine, and the coil supports are about one centimeter in thickness and they have flow and return passages 40 for cooling liquid within their interior.

Figures 8, 9, 10:
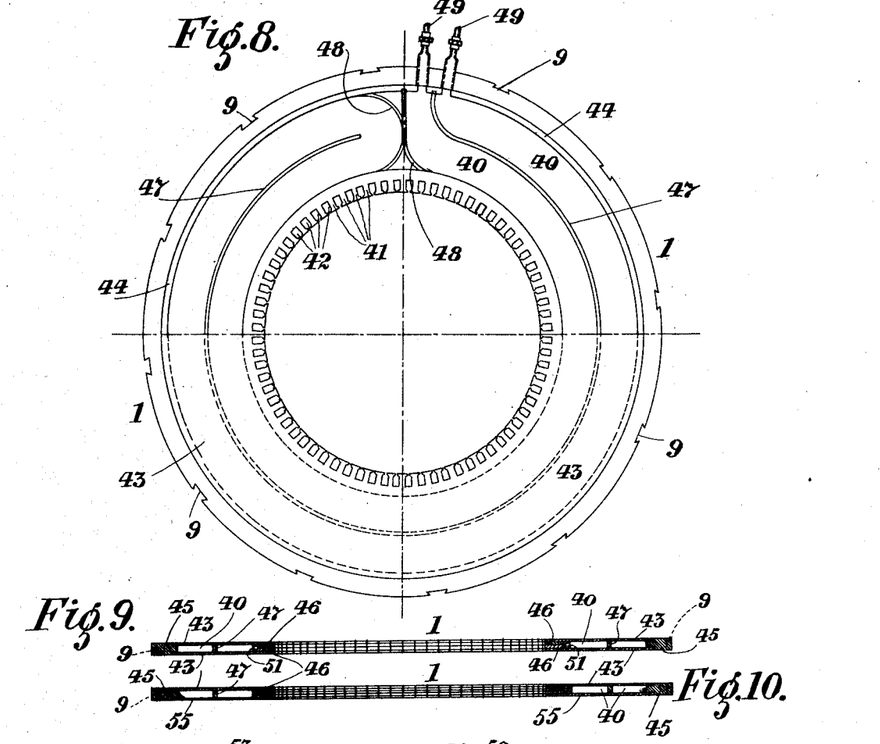
Fig. 8 is a view of one of the coil supports built into the stator core.
Fig. 9 is a cross section of the support shown in Fig. 8.
Fig. 10 shows an alternative method of construction to that shown in Fig. 9.
Figure 9A:
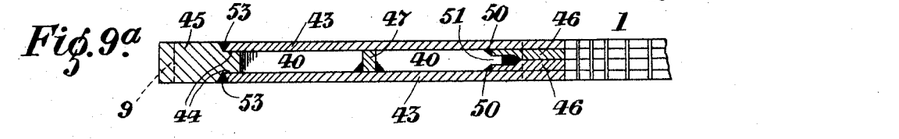
Figure 10A:
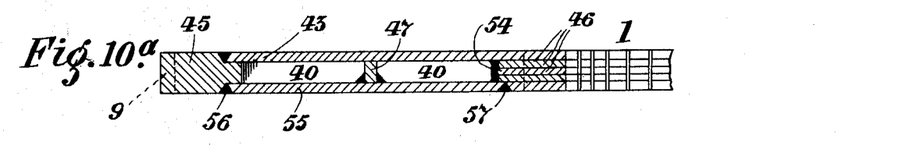

As the supports 1 are within the active magnetic field, the metal of which they are built must be non-magnetic, and the inner periphery with supporting teeth 41 and winding slots 42 cut in, must be strong in construction and be laminated to reduce eddy currents and for these reasons the form of construction of this coil support as shown in Fig. 8 is adopted.

In the lower half of Fig. 8 the cover plate 43 is shown in position but in the upper half it is omitted to show the seating 44 on which it rests and the passage 40 inside the coil support. If the machine be of large dimensions, the support could be divided into sectors but the same general construction would be used in both cases.

The method of construction is to form the outer periphery of an endless strip of hard brass 45 of sufficient radial depth to take the keyways 9 and to give a strong welded joint with the side plates 43.

The inner periphery is formed by the side plates 43, 43, and rings 46 serving as distance pieces to give a requisite space for the liquid passages 40. The radial width of the rings 46 must be sufficient to allow the winding slots 42 to be formed in them and to afford strong and tight joints well out of the magnetic field.

The flow and return passages for the cooling liquid are formed by welding or brazing a strip 47 on edge on one of the side plates 43. When clamped in position the other side plate 43 forms a close joint with the edge of the strip not welded. Suitable water deflection plates 48 (Fig. 8) would be provided to divert the flow of cooling liquid where necessary and would also be welded on to the same side plate 43.

The inlet and outlet for the cooling liquid are formed by solid drawn pipes 49, 49, with a union attached to one end of the pipe and the other end is flattened out to come within the thickness of the passage 40, these inlet and outlet pipes are securely welded or brazed to the outer strip 45.

The various joints between the plates and parts connected therewith are made as follows:—Each inner ring 46 is welded to its disk 43 by a weld 50 at the inner corner near the inside periphery, the diaphragm strips 47 and 48 are then welded on edge on one of the disks 43. The two inner faces of the rings 46 are machined with a shallow recess 51 and tinned with hard solder. The outer ring 45 is machined to a circle on the outer periphery and on each face are turned two recesses 44 for taking the side disks 43, 43, and countersunk recesses 53 for taking the weld between the rings 45 and the disks 43, 43. The inner joint between the rings 46, 46, can be made by hard solder from outside the plates 43, 43, and the flow of the solder making the joint can be limited to the depth of the shallow recesses 51 provided for it.

As an alternative method of construction and in order to avoid internal joints the method of construction shown in Figs. 10 and 10ª is adopted.

The outer periphery would be formed of a ring 45, as before, but the inner periphery would consist of one side plate 43 and rings 46 having winding slots 42 in Fig. 8 formed in the inner peripheries.

The diaphragm strips 47 and the deflection plates 48 would be welded or brazed on the side plate 43 to it and to each other would also be welded the rings 46 at 54. The coil support would be completed by welding, or soldering, or brazing another side plate 55 at the points 56 and 57.

The final shape and application is identical with the coil support shown in Fig. 9 but all joints are external and can be inspected during construction.

The solderings, weldings, or brazings are shown in solid black in the drawings.

In either method of construction at the inner periphery the various plates, though in close contact, are not in solid metallic connection except at the joints or welds, and, as a consequence, eddy currents are limited in amount.

With either construction the combination of plates forming the support is then turned on the outer periphery and the keyways 9 machined out to exactly correspond with the keyways on the stator disks so that the winding slots 42 in supports 1 also correspond exactly with the winding slots 8 in the stator disks and that the slots 42 and 8 shall form continuous and uniform winding slots the entire length of the stator core when the coil supports are built in place.

While the fluid pressure to which the cooling liquid ducts will be subjected need not be considerable they should be constructed of sufficient strength to enable them safely to withstand medium pressure steam. The coil supports can then be adequately tested during construction and building, and the machine can be heated up and the insulation on the conductors molded to due form as already described.

For certain purposes it is desirable to have a winding which shall be impervious to water whereby generators or motors may work in wet positions or even when flooded.

For this purpose, the straight portions of the windings are to be insulated with mica paper molded in the usual manner in hot presses giving a jointless impervious insulation.

The insulation on the spiral end connections should be of a character that when heated the insulation is molded into a jointless supporting material making an impervious joint with the mica insulation and filling up all spaces between the windings, the coil supports 2, 3, and the stator frame 10.

As an example a combination of insulating fabric like that commercially known as Empire tape and vulcanizing rubber of substantial thickness may be used. When the windings are all in place the cooling elements are to be heated with steam of sufficient temperature to vulcanize the rubber and form an impervious mass of insulation around the windings and between them and their respective coil supports.

This method of construction also insures freedom from vibration of the various conductors and gives additional supporting material between them and their respective coil supports 2, 3.

The material of the various types of which the coil supports are to be made has been described as gun-metal or brass, but I do not confine my construction to these metals,—which are given as examples only,—but would have it understood any other suitable metal may be used. Also the cooling liquid may be water or any other suitable liquid.

For the sake of clearness air vent pipes have been omitted, but these may be applied to the spaces for the cooling liquid in any of the hollow coil supports herein described.

Having now fully described my invention what I claim and desire to secure by Letters Patent is:—

1. In a dynamo-electric machine, the combination of end supports on the stator frame having passages adapted for fluid circulation, projections on the supports forming between them recesses for the inner layers of the stator end windings, and clamps provided with passages for fluid circulation, said clamps having projections forming between them recesses for the outer layers of the stator end windings, said fluid cooled clamps serving to secure said end windings in place in the recesses.

2. In a dynamo-electric machine, the combination of end supports on the stator frame provided with passages adapted for fluid circulation, said supports having projections forming between them a series of spiral recesses for the inner layers of stator end windings, and clamps having passages adapted for fluid circulation, said clamps also having projections lying across the first mentioned projections and forming between them a second series of spiral recesses for the outer layers of the stator end windings.

3. In a dynamo-electric machine, the combination of end supports on the stator frame provided with passages adapted for fluid circulation, said supports having flattened curvilinear projections forming between them a series of spiral recesses for the inner layers of stator end windings, and clamps provided with passages adapted for fluid circulation, said clamps having flattened curvilinear projections lying across the first mentioned projections and forming between them a second series of spiral recesses for the outer layers of the stator end windings.

4. In a dynamo-electric machine, the combination of supports for the stator end windings secured one at each end of the stator frame, said supports having passages adapted for fluid circulation, an external clamp for each support and having a passage adapted for fluid circulation, means between each of said supports and its respective clamp forming recesses for inner and outer layers of said end windings, and means whereby fluid may be circulated through the said passages in the supports and clamps.

5. In a dynamo-electric machine, the combination of supports for the stator end windings secured one at each end of the stator frame, said supports having passages adapted for fluid circulation, an external clamp for each support and having a passage adapted for fluid circulation, coöperating means on the supports and forming recesses therebetween for inner and outer layers of said end windings, and means whereby fluid may be circulated through the passages in the supports and clamps.

6. In a dynamo-electric machine, the combination of annular supports for the stator end windings, secured one at each end of the stator frame and made up of segments secured together, said supports having passages adapted for fluid circulation, an external clamp for each support and having a passage adapted for fluid circulation, and means between each support and its clamp forming recesses for inner and outer layers of the said end windings, there being a fluid supply inlet for the passages of the supports and clamps.

7. In a dynamo-electric machine, the combination of annular supports for the stator end windings, secured one to each end of the stator frame and having passages adapted for fluid circulation, teeth on the inner periphery of each support adapted to embrace the stator windings, clamps, one for each end support, said clamps having passages adapted for fluid circulation, and projections between each end support and its clamp forming winding spaces for the stator end windings, there being a fluid supply inlet for the passages of the supports.

8. In a dynamo-electric machine, the combination of annular supports for the stator end windings, secured one at each end of the stator frame, said supports having passages adapted for fluid circulation, spirally shaped projections secured on the outer face of each support forming spirally shaped recesses therebetween for the reception of the inner layers of said end windings, clamps one for each support, said clamps having passages adapted for fluid circulation, spirally shaped projections secured to each clamp forming spirally shaped recesses therebetween for the reception of the outer layers of the said end windings, plates secured to said supports, plates secured to the said clamps closing the hollow spaces therein and forming the seats of the spiral shaped recesses, and means for securing the clamps to the supports with the end windings therebetween, there being a fluid supply inlet for said passages of the supports and clamps.

9. In a dynamo-electric machine, the combination of annular supports for the stator end windings, secured one at each end of the stator frame, said supports having passages adapted for fluid circulation, an external clamp for each support made up of segments secured together, said clamps also having a passage adapted for fluid circulation, and means between each support and its clamp forming recesses for the inner and outer layers of said end windings, there being a fluid supply inlet for the passages of the supports and clamps.

In testimony whereof I affix my signature in presence of two witnesses.

JOSEPH SHEPHERD.

Witnesses:
 MARY GREEN,
 KATE WALKER.